March 24, 1953  F. CRENSHAW  2,632,670
LET-DOWN AUTOMOBILE TOP WITH TELESCOPIC SECTIONS
Filed Nov. 15, 1949  3 Sheets-Sheet 1
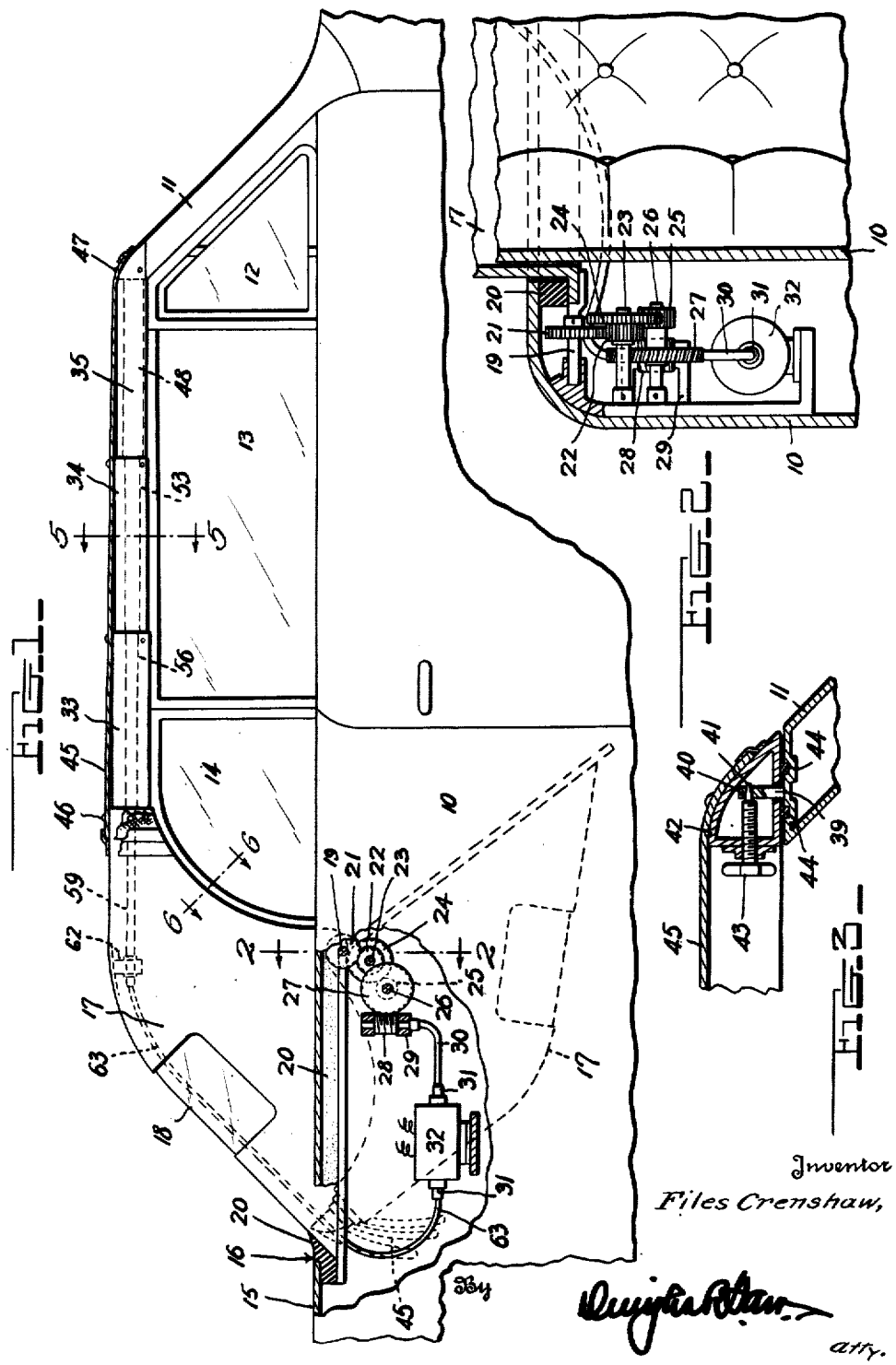
Inventor
Files Crenshaw,
atty.

March 24, 1953 F. CRENSHAW 2,632,670
LET-DOWN AUTOMOBILE TOP WITH TELESCOPIC SECTIONS
Filed Nov. 15, 1949 3 Sheets-Sheet 2
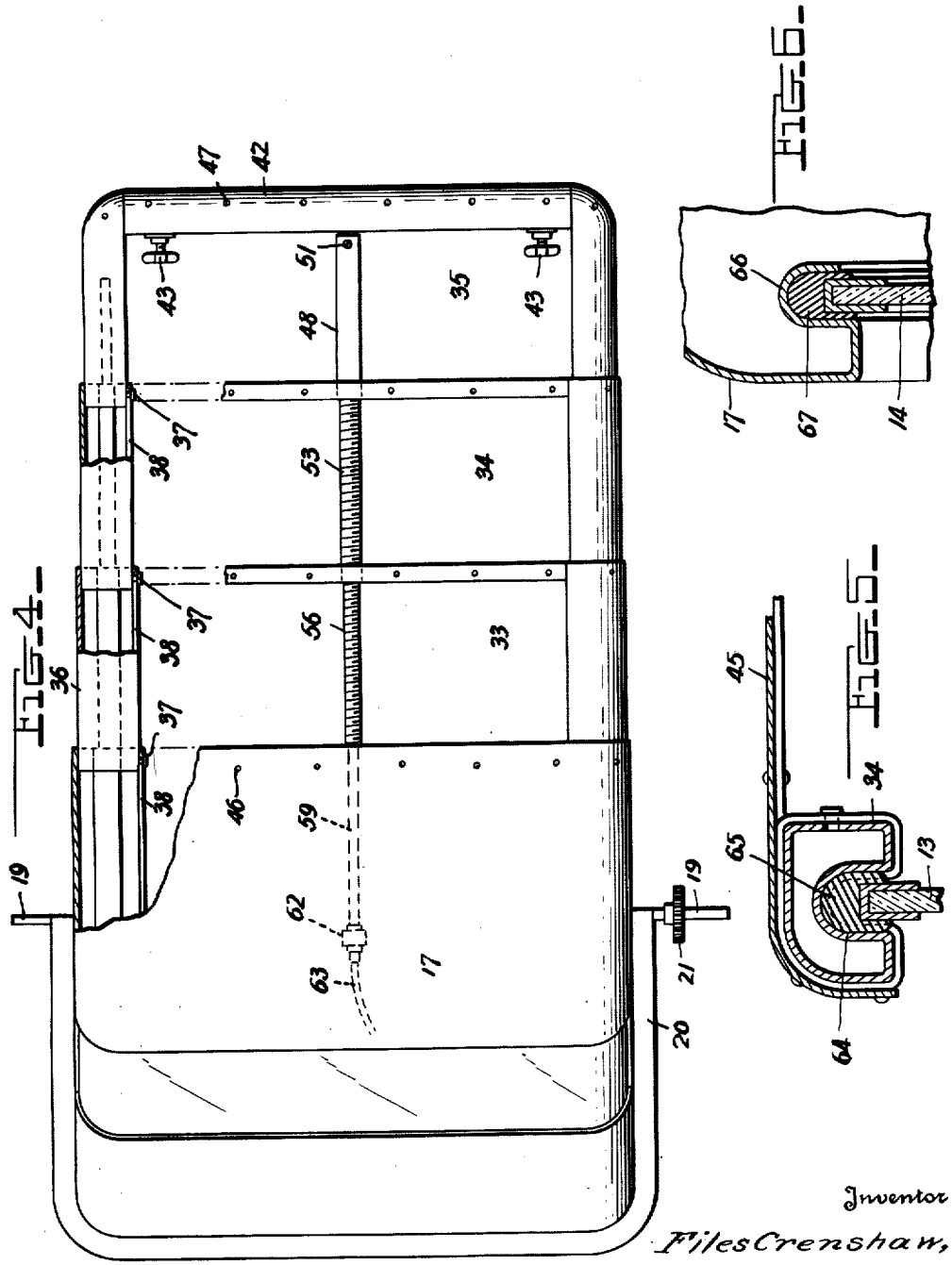
Inventor
Files Crenshaw,
By
atty.

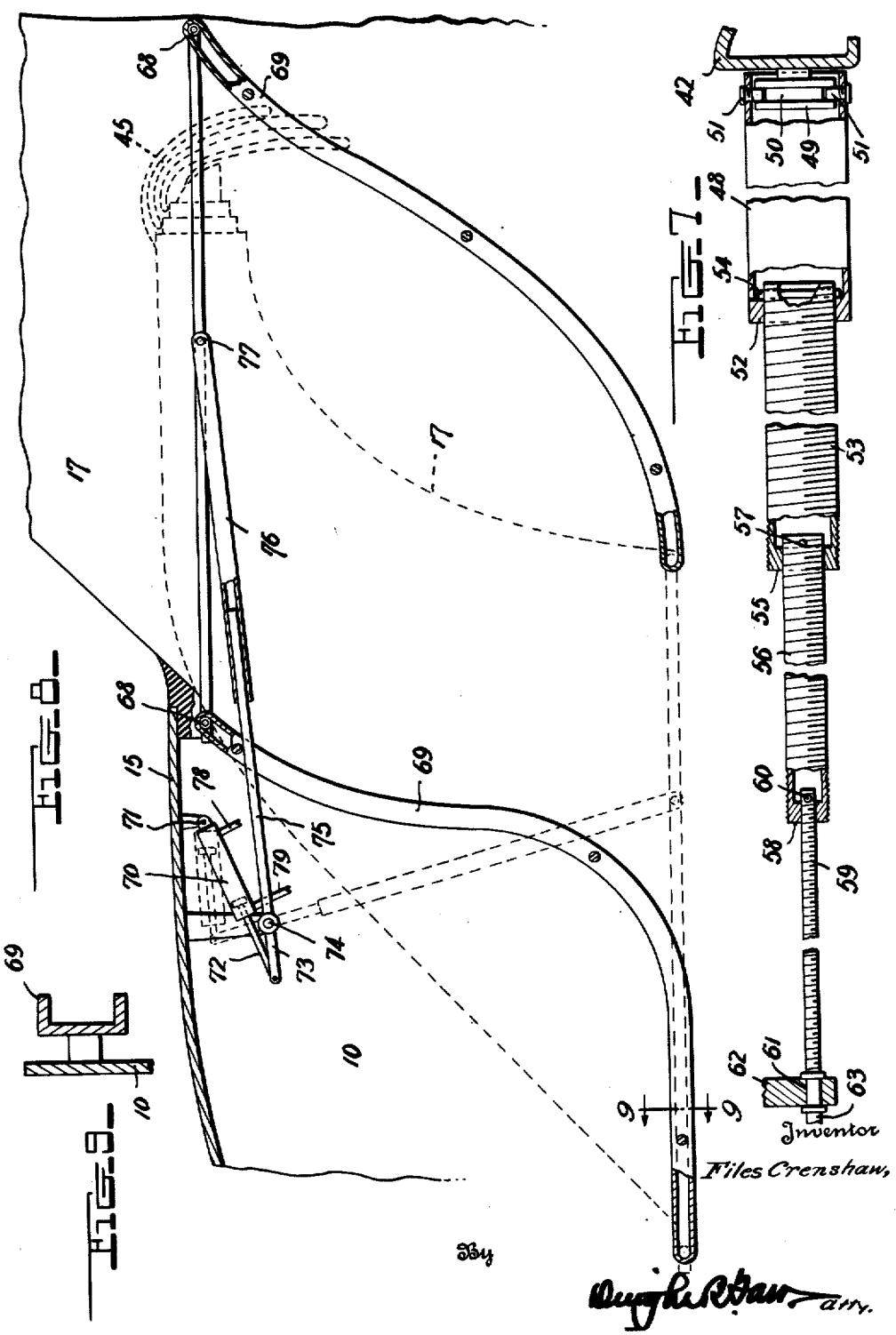

Patented Mar. 24, 1953

2,632,670

UNITED STATES PATENT OFFICE 2,632,670

LET-DOWN AUTOMOBILE TOP WITH TELESCOPIC SECTIONS

Files Crenshaw, Montgomery, Ala.

Application November 15, 1949, Serial No. 127,331

1 Claim. (Cl. 296—117)

This invention is a convertible vehicle top and has particular reference to tops for use in connection with automobiles, motor boats and other vehicles of similar character.

The primary object of the invention is to provide a top for vehicles capable by simple operations of being extended in raised position from the vehicle body to form a cover in association therewith, and which may with equal facility be retracted and compacted in an out of the way place when the top is not required.

A further object of the invention is to provide means of simplified construction whereby the top may be automatically extended from a position within the body to operative position and improved and simplified means for extending the cover or protective device from a protracted position within the top.

A still further object of the invention is to provide improved means in connection with a convertible top for vehicles which is positive in its operations to either extend or retract the top with a minimum of effort.

A still further object is to provide a convertible top for vehicle bodies which when retracted or moved to inoperative position will be entirely contained within the body in an out of the way and snug position, but which may by simple mechanical means be automatically projected from such position to a fully erected and extended position to completely and in a sealed manner cover the occupant portion of the vehicle when desired.

The invention is carried out by the means hereinafter referred to in the description, illustrated in the drawings and particularly pointed out in the claim.

In the drawings:

Fig. 1 is a side elevation, parts broken away, of the side of a conventional form of motor vehicle and illustrated as applied thereto a convertible top involving the invention, Fig. 2 is an enlarged fragmentary sectional view taken substantially upon line 2—2 of Fig. 1.

Fig. 3 is a fragmentary sectional view on an enlarged scale showing the means of connecting the extended top to the windshield portion of the vehicle.

Fig. 4 is a top plan view, parts broken away, of the top as it will appear in extended position.

Fig. 5 is a transverse sectional view taken substantially on line 5—5 of Fig. 1.

Fig. 6 is a similar view taken upon line 6—6 of Fig. 1,

Fig. 7 is an enlarged detail side elevation, parts broken away, showing the power connection for operating the visor sections of the top, Fig. 8 is a side elevation, parts broken away, showing a modified form of retractible top, and Fig. 9 is a transverse sectional view taken upon line 9—9 of Fig. 8.

The convertible top of my invention resides generally in a substantially rigid top section or element so mounted within a recess or well provided in the vehicle as to be swung into said well when not in use and projected from said well when the top is in operative position. In the present instance, by way of illustration, the convertible top is shown as applied to an automobile, but it will be readily understood that its use is not necessairly restricted to vehicles of this character but may with equal facility and usefulness be applied to boats or other vehicles. The disappearing top section referred to is equipped with extensible members which when projected constitute a continuous visor to project forwardly from the top element and are capable of being readily attached to or removed from the windshield portion of the vehicle.

Referring now more particularly to the drawings, the vehicle body is indicated generally at 10 and has projecting upwardly therefrom near its forward end the windshield frame indicated at 11. The body may also be equipped with ventilator windows or panes 12 in the usual manner, as well as side panes 13 carried by the door and capable of being raised or lowered therein in conventional manner. The side of the vehicle may also be equipped with the sight window 14, either fixed or retractible, as will be understood.

The body 10 has the usual deck portion 15 rearwardly of the seats within the vehicle which deck is provided with an opening 16 in its top giving access to the well or recess within the vehicle. The opening of this well will be sufficiently long and sufficiently broad to accommodate in either swinging or sliding position the top member indicated at 17. This top member will be of rigid construction and preferably formed of steel, having the rear window 18 provided therein. This top member 17 has secured thereto at its bottom and near its forward edge outwardly projecting and laterally disposed trunnions 19 which will be rotatably secured in suitable bearings in the vehicle body so as to permit the said top to rotate, within given limits, upon said trunnions. The top is so shaped and is of such size as when rotated to projected position, as shown by full lines in Fig. 1, the said top will be projected or extended upwardly and out of the opening of the well, but when in retracted position will swing downwardly to the position shown by the dotted lines in Fig. 1 so as to be wholly enclosed within the well in the vehicle body. In order to seal the well against leakage when the top section is extended, the opening in the deck 15 may be provided with a gasket 20 against which the lower edges of the top will firmly engage when the top is in projected or operative position.

One of the trunnions 19 is provided with a gear 21 in mesh with an intermediate gear 22 mounted upon a shaft 23 arranged within the body of the vehicle. The shaft 23 carries a larger gear 24 which is in mesh with a pinion 25 carried by a second shaft 26 within the vehicle body, and to which is secured a larger gear 27. The gear 27 is a worm gear and meshes with a worm 28 rotatably secured within the body in bearings 29. The worm 28 is driven by a worm shaft 30 secured to the drive shaft 31 of a conventional motor 32 secured within the vehicle body. The motor 32 is of conventional form and of reversible type, that is, it may be operated to drive the shaft 31 in either clockwise or counter-clockwise direction when desired.

The rigid top member 17 has connected therewith visor sections indicated at 33, 34 and 35. These sections include substantial rectangular frames having their side elements 36 so arranged as to telescope one within another, each of said sections having an inwardly extending pin 37 to travel within a slot or trackway 38 in the next adjacent section. The visor section 33 when retracted will slide or telescope within the upper and forward portion of the rigid top element 17, while the section 34 telescopes within the section 33; the section 35 telescoping within the section 34. The forward end of the visor section 35 is to be detachably secured to the top of the windshield frame or posts 11, and to this end the windshield frame is provided with two or more upstanding posts 39, having openings 40 near their upper ends to receive the tapered ends of the forwardly projecting threaded pins 41 rotatably mounted in the forward transverse bar 42 of the visor section 35. Each of the threaded pins 41 is provided with a hand wheel 43 by means of which the pins may be rotated in their threaded bearings. The upper transverse bar of the windshield frame or post may be provided with gaskets 44 to engage with the lower edges of the visor section 35 to seal the joint between these parts against the ingress of water, dust or air.

The telescopic sections 33—34—35 have secured thereto a continuous flexible or collapsible top 45, formed of fabric or any other suitable material. This fabric is secured as by rivets or by any other suitable means 46 at its rear end to the forwardly projecting portion of the rigid top 17, while the forward end of the said cover is firmly secured as at 47 to the foremost end of the visor section 35. It will be understood that this cover may be made of any suitable weatherproof or weather-resisting material and will entirely cover the various sections of the telescopic visor when the latter are extended. When the visor sections are collapsed, however, the flexible top 45 will fold upon itself in the manner substantially as shown by dotted lines in Fig. 1.

The transverse bar 42 of the foremost visor section 35 has attached thereto, preferably intermediate its ends, a tubular member or shaft 48. This shaft at its forward end encloses a circular bearing 49 rigidly secured to the cross bar 42 and provided in its periphery with an annular groove 50, in which extend the ends of pins 51 carried by the shaft 48. This method of mounting the shaft 48 permits of free rotation of the shaft. The rear end of shaft 48 is closed by a head 52 provided with an internally threaded opening to receive the hollow shaft 53. The shaft 53 is provided with a cross pin 54 at its forward end which permits of free rotation of the shaft 53 with respect to the shaft 48 but holds the said shafts against becoming detached from one another. The hollow shaft 53 at its rear end is closed by a head 55 which is internally threaded to receive the hollow externally threaded shaft 56. The shaft 56 is similarly provided at its forward end with a cross pin 57 disposed within the hollow shaft 53, permitting relative rotation between the two shafts but preventing the same from becoming separated. The rear end of shaft 56 is likewise closed by a head 58 which is internally threaded to receive the threads upon the exterior of a drive shaft 59. The forward end of the drive shaft extends into the hollow shaft 56 and is equipped with a cross pin 60 for purposes which will be obvious. The rear end of the drive shaft 59 is rotatably mounted as at 61 in a support 62 rigidly secured within the top member 17.

A flexible drive shaft 63 is connected at one end with an end of the power shaft 31 of the motor 32, and the opposite end of the said flexible shaft is secured to the rear end of the drive shaft 59 above described.

Assuming the several telescopic sections of the top to be in collapsed or retracted positions wholly enclosed within the rigid top 17, and the latter swung into retracted position as shown by dotted lines in Fig. 1, energizing the motor in such manner as to drive the gear 21 in clockwise direction will cause the trunnions to rotate in such direction as will swing the top upwardly and out of the well opening in the deck 15 to the position shown by full lines in Fig. 1. When swung to the limit of its upward movement, the drive shaft 59 for the telescopic sections will be in substantially horizontal position. As this movement is taking place, the flexible shaft 63 is rotating the power shaft 59, which causes the shafts 56 and 53 to be rotated, the threaded connections between the shafts 59, 56, 53 and 48 causing the said sections to be extended to the position shown in full lines in Fig. 1. When the sections have all been extended the flexible cover 45 will have been stretched to its limit, and the forward end of the visor is seated upon and locked with the windshield frame by operation of the hand wheels 43.

In Fig. 5 of the drawing there is shown a detail transverse section through the visor section 34 and disclosing a preferred means for accommodating the sliding window 13 carried by the door. It will be observed from this figure that the underface of the section 34 is provided with a longitudinally disposed channel 64 within which is seated a relatively heavy gasket 65 to receive the upper end of the pane 13 when the latter is moved to raised position. In this manner the window is held against vibration and the joint between the window and the telescopic frame is adequately sealed.

In Fig. 6 of the drawing there is shown a detail of the connection between the rigid top member 17 and the pane 14 of the body. The side of the rigid top 17 has a deformed portion 66 providing a recess corresponding to the contour of the edge of pane 14 and having therein a sealing element or gasket 67 to insure a vibration proof as well as waterproof connection between the glass pane and the rigid top 17.

When it is desired to retract the cover it is but necessary to withdraw the tapered pins 41 from locking engagement with the posts 39 and bringing the motor 32 into operation in such direction as will cause the gears 21 to move in counter-clockwise direction. The rigid top 17 immediately turns upon its pivot 19 so as to move through an arc to bring it wholly within the well in the deck portion 15, while at the same time the telescopic shafts 59, 56, 53 and 48 will retract the several sections into encompassing relationship with one another entirely within the upper portion of rigid top member 17.

In Fig. 8 of the drawing there is disclosed a slightly modified form of the invention, which form pertains to the projection and retraction of the rigid top member or section 17. In this form of the invention the top member is provided in its sides and at its forward and rear ends with rollers 68 which travel in sinuous track members 69 secured within the body and at the sides thereof. These tracks are so arranged within the body that the top member 17 may be wholly retracted and accommodated within the well which has its upper opening in the deck 15. The retracted position is shown by dotted lines in Fig. 8. In this form of the invention the electric motor above referred to may be dispensed with and a hydraulic cylinder 70 may be employed. This cylinder is arranged within the deck and is pivoted at one end as at 71. The piston within the cylinder has the outer end of its rod 72 pivoted to the short end 73 of an arm pivoted at 74 within the body and whose long arm 75 slidably engages in a sleeve 76 pivoted at its forward end as at 77 to the side of the rigid top section 17 substantially intermediate the ends thereof. The construction is such that when fluid pressure is admitted to the inner end of the cylinder 70 through the pipe 78 the piston will be forced to the limit of its outward movement, whereupon the top 17 will be caused to be projected from the body of the vehicle as shown by full lines in Fig. 8. Upon the application of pressure to the opposite end of the cylinder 70 through the pipe 79, however, the piston will be moved to retracted position, causing the lever to rock upon its pivot 74 to the dotted line position as shown in Fig. 8, during which movement the rigid top 17 will move downwardly by reason of the rollers 68 travelling in the serpentine tracks 69 to its final position as shown in dotted lines in the said figure. In this modified form of the invention a motor drive for the extensible sections similar to that shown in Fig. 1. may be employed for extending or collapsing the several visor sections, or any other preferred means of bringing about the telescopic operation of these sections may be employed.

From the foregoing it is apparent that I have provided a convertible top for vehicles which is extremely simple in its construction and operation, which involves relatively few simple and readily assembled parts, which parts are so constructed and organized as to minimize the opportunity for wear, breakage or derangement, which has its parts so constructed and associated with one another as to be positive and easy in operation, and which will prove highly practical and efficient in use.

I claim:

The combination with a body having a well opening at its upper end; of a top pivoted near one end within said well and capable of swinging into or out of the latter, a motor, a drive connection between said motor and for said top for swinging the same upon its pivot, a plurality of visor sections telescopically connected together and carried by said top, interengaging threaded shafts carried by said sections, a drive shaft for rotating said sections, and a drive connection between said motor and said drive shaft.

FILES CRENSHAW.

REFERENCES CITED

The following references are of record in the file of this patent:

UNITED STATES PATENTS

| Number | Name | Date |
|--------|------|------|
| 1,278,837 | Birney | Sept. 17, 1918 |
| 1,306,836 | Perlman | June 17, 1919 |
| 1,321,913 | Hedges | Nov. 18, 1919 |
| 1,952,252 | Heuser | Mar. 27, 1934 |
| 2,028,999 | Seitz | Jan. 28, 1936 |
| 2,215,363 | Rupple et al. | Sept. 17, 1940 |

FOREIGN PATENTS

| Number | Country | Date |
|--------|---------|------|
| 134,935 | Great Britain | Nov. 14, 1919 |
| 223,789 | Great Britain | Oct. 30, 1924 |